United States Patent
Wischermann

(12) 
(10) Patent No.: US 6,388,704 B1
(45) Date of Patent: *May 14, 2002

(54) LENGTH DETECTION OF SLANT SCRATCHES

(75) Inventor: Gerhard Wischermann, Weiterstadt (DE)

(73) Assignee: BTS Holdings International B.V., Breda (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/927,009

(22) Filed: Sep. 10, 1997

(30) Foreign Application Priority Data

Sep. 11, 1996 (DE) .......................... 196 36 864

(51) Int. Cl.$^7$ .......................... H04N 1/409; G06R 4/40; G06T 5/00
(52) U.S. Cl. .......................... 348/125; 382/275
(58) Field of Search .......................... 348/125, 128, 348/616, 622, 156, 157, 158, 607, 241; 382/108, 276, 107, 192, 274, 275, 266; H04N 1/409; G06K 9/40; G06T 5/00

(56) References Cited

U.S. PATENT DOCUMENTS

| | | | | |
|---|---|---|---|---|
| 4,691,231 A | * | 9/1987 | Fitzmonrris et al. ........ 358/106 |
| 4,941,186 A | * | 7/1990 | Massmann et al. ........... 382/54 |
| 4,977,521 A | * | 12/1990 | Kaplan ........................ 364/525 |
| 5,097,521 A | * | 3/1992 | Massmann .................... 382/54 |
| 5,179,419 A | * | 1/1993 | Palmpist ..................... 356/73.1 |
| 5,204,910 A | * | 4/1993 | Lebeau ........................... 382/8 |
| 5,408,104 A | * | 4/1995 | Gorria et al. ............... 250/572 |
| 5,450,500 A | * | 9/1995 | Brett .......................... 382/162 |
| 5,471,263 A | * | 11/1995 | Odaka ......................... 352/27 |
| 5,589,887 A | * | 12/1996 | Wischermann .............. 348/616 |
| 5,673,336 A | * | 9/1997 | Edgar et al. ................ 382/167 |
| 5,809,162 A | * | 9/1998 | Csipkes et al. ............. 382/108 |
| 5,987,187 A | * | 11/1999 | Wischermann et al. ..... 382/275 |

FOREIGN PATENT DOCUMENTS

DE 4432787 3/1996 .......... H04N/5/253

* cited by examiner

Primary Examiner—Chris Kelley
Assistant Examiner—Tung Vo
(74) Attorney, Agent, or Firm—Joseph S. Tripoli; Harvey D. Fried; Francis A. Davenport

(57) ABSTRACT

A video signal-processing device, for example a film scanner, including an arrangement for detecting scratches in images of a video signal. To improve the detection of slant scratches, the arrangement for detecting scratches combines a given number (m) of series-arranged pixels (43, 44) of a video image to form a group (45), and to determine a division of the pixels in accordance with given criteria for each group of pixels and, based on this division, to classify the pixel groups in scratch sections and non-scratch sections.

16 Claims, 6 Drawing Sheets

LENGTH DETECTION OF SLANT SCRATCHES

BACKGROUND OF THE INVENTION

1. Field of the Invention

The invention relates to a video signal-processing device comprising an arrangement for detecting film scratches. The invention also relates to the arrangement for detecting film scratches as such, and to a method of detecting scratches.

2. Description of the Related Art

Older films, particularly those which are frequently used, often have vertical scratches which extend continuously through longer parts of the film. These scratches may have already been produced in the film camera or during the copying process, or also by frequent playback of the film.

When such film material is displayed, the scratches occur as white or black horizontal stripes in positive or negative film material, respectively. A method and arrangement for detecting and concealing errors in a video signal caused by vertical film scratches is known from German offenlegungsschrift DE 44 32 787.0, corresponding to U.S Pat. No. 5,589,887, in which an error signal is derived from disturbed spots produced by disturbed pixels and used in the form of a control signal for concealing the errors in the video signal. To be able to safely distinguish scratches from other, vertically extending picture details such as, for example, flag poles, the error signal is only generated when an adjustable, locally limited scratch width in the horizontal direction is not exceeded and when each scratch essentially extends vertically, and when the scratch length corresponds approximately to the frame height. The disturbed spots in the video signal are subsequently replaced by the corresponding low-pass-filtered video signal with the aid of the error signal, so that the pixels of the scratch assume the brightness and color of the pixels in the close surroundings of the scratch and very strong contrast differences can thus be avoided.

It has been described in the German Offenlegungsschrift DE 44 32 787.0 that, to evaluate the length expansion of a scratch, superjacent pixels of a scratch which does not extend throughout the height of an image are expanded throughout the image, height by means of line sorting and vertical low-pass filtering with the aid of a median filter, as from a certain minimum expansion of the scratch. The minimum value from which a scratch is expanded can only be indirectly predetermined via the number of taps on the median filter; the length expansion of slant scratches cannot be performed with this arrangement.

However, in the detection of scratches, the determination of the scratch length was a decisive feature of distinction, because a decision which was only based on other scratch features, such as the width of the scratch and contrast distinctions caused by the scratch, could also be caused by other image details which should certainly not be suppressed. Moreover, in the known circuit arrangement, the impurity concealment signal used for concealing the scratch covers the area of a video image which a rectangle in the video image circumscribing the scratch would occupy. The larger the inclination of a scratch, the larger the area which should actually not be concealed.

SUMMARY OF THE INVENTION

It is therefore an object of the invention to provide a method and a circuit arrangement for processing video signals in which scratches in the video signal, particularly slant scratches can be reliably distinguished from other, scratch-like image structures. It is another object of the invention to generate a scratch mask, or an impurity concealment signal derived therefrom, which better corresponds to the shape of a slant scratch.

According to the invention, in an arrangement for detecting scratches, this object is solved in that the arrangement for detecting scratches is intended to combine a given number of series-arranged pixels of a video image to form a group, and to determine a division of the pixels in accordance with given criteria for each group of pixels and, based on this division, to classify the pixel groups in scratch sections and non-scratch sections.

The invention is based on the recognition that for an evaluation of the accumulation of pixels with corresponding properties, which may also be expected in scratches (width, contrast, . . . ) within a given image column with slant scratches, or scratches with interruptions, the threshold value used for detection had to be decreased to such an extent that the confusion of the remaining pixels of a scratch with pixels having similar properties but constituting actual objects in the image would become more and more probable. The assessment criterion proposed in the invention, namely that not only each individual pixel must fulfil a given criterion but that a predetermined number of pixels must have a given minimum division of properties, reduces the probability that accidentally distributed pixels within this group also have this property. In this way, a scratch is no longer examined as a whole, for example, whether a sufficient number of pixels having corresponding properties can be combined to form a scratch, but that accumulation and alignment of image details having given structural properties are evaluated as the actual presence of a scratch. Since image objects with corresponding structural properties occur considerably less frequently than image objects composed of an equal number of accidentally distributed individual pixels with the corresponding properties, a more reliable answer as to whether a scratch is actually present is obtained when the structural properties of presumable scratches are examined.

To this end, an embodiment of the invention is characterized in that the number of pixel groups, classified as scratch sections of an image area of the video image in which a scratch is suspected, is determined, and this number is compared with a first threshold value, the suspected scratch being signalized as a recognized scratch only when the first threshold value is exceeded.

The invention is based on the recognition that a scratch must be composed of a given minimum number of scratch sections so as to be accepted as a scratch. If the number of detected scratch sections is too low, image details are mostly concerned which comply with the criteria for scratch sections but are actually partial structures of an image object. Since the accumulation of such image structures occurs less frequently than the accidental occurrence of pixels, the decision about the number of scratch sections is much more reliable.

Since for a corresponding accumulation of scratch sections an actual scratch is concerned, sections which do not have the accumulation of a continuous scratch may be accepted as scratches, i.e., also partially interrupted scratches are accepted. This is particularly advantageous because, for example, a black scratch which extends through a dark image area is present but is no longer visible. It is true that this scratch need not be concealed, but it reduces the measurable overall length of a scratch when it is examined in the conventional manner and would thus prevent detection of the scratch.

In an advantageous embodiment of the invention, the decision threshold on which part of a scratch should at least be visible to be still accepted as a scratch can be adapted to the relevant image contents by changing the threshold value.

Preferably, the pixel groups classified as scratch sections may be used for forming a scratch mask by means of which the scratch can be concealed. This has the advantage that a mask formed in that way can be adapted much more accurately to the shape of a scratch, as compared with the situation where the mask would extend beyond the image section circumscribed as a rectangle by the scratch.

A very simple embodiment of the invention is obtained when the pixels occurring in a given number of vertically subjacent lines at the same horizontal position are combined to form pixel groups. In this way, each video image is divided into strips and only the directly subjacent pixels of a strip are considered. This has the advantage that scratch sections can be detected without much effort.

In a special embodiment of the invention, the high-pass-filtered pixels are compared, for the purpose of classification of scratch sections, with at least a contrast threshold value, the sum of the pixels of a pixel group exceeding a given contrast threshold value are determined and, in so far as this sum exceeds a further threshold value, this pixel group is classified as a scratch section.

Particularly high-pass-filtered signals essentially contain only signal parts of pulse-shaped image objects. If these pulse-shaped image objects also exceed a given contrast difference, then a pre-selection has already been made among the image signals qualifying as scratches anyway. However, only when a given minimum number of pixels also has the same contrast difference, it can be assumed for this pixel group that it has a structure which is similar to that of segments or sections of scratches.

These and other aspects of the invention are apparent from and will be elucidated with reference to the embodiments described hereinafter.

DESCRIPTION OF THE PREFERRED EMBODIMENTS

Figure 1:
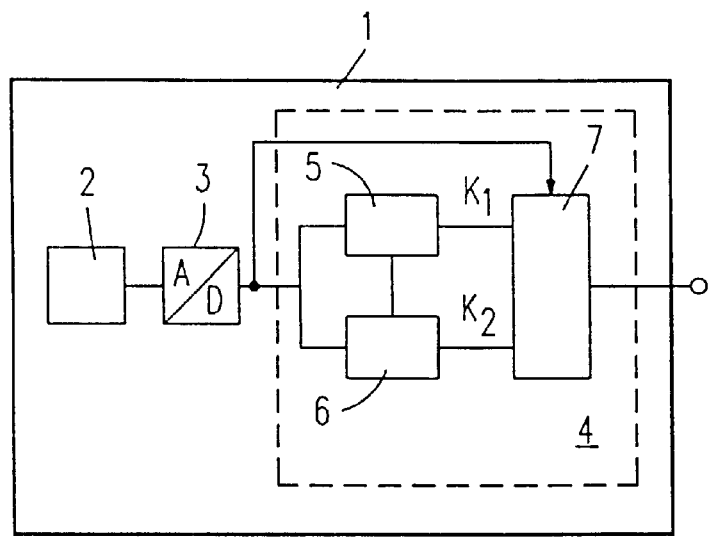
FIG. 1 shows a film scanner with an arrangement for detecting and concealing scratches, including slant scratches.

FIG. 1 is a block diagram of a film scanner 1 in which the analog video signal of a scanned film, generated in a scanner 2, is converted, in an A/D converter 3, into digital luminance and chrominance signals. In an arrangement 4 for eliminating noise, several detectors 5, 6 are intended to detect errors in the scanned video signal and characterize them by means of impurity signals $K_1$, $K_2$. The detectors are scratch detectors 5 which are implemented in accordance with the characteristic features of the invention for detecting slant scratches and, for example a dirt detector 6. The impurity signals $K_1$, $K_2$ control a median filter 7 which replaces image areas classified as errors by their median-filtered substitute values.

The arrangement for detecting scratches according to the invention is, however, not only limited to film scanners, but may also be used in any arrangement for eliminating noise in video signals, thus also, for example, when displaying stored video signals, and also as an independent device in a so-called noise reducer. Also the type of source signal, whether analog or digital, does not play a role for the essence of the invention, because signal conversions are always possible without any problem.

Figure 2:
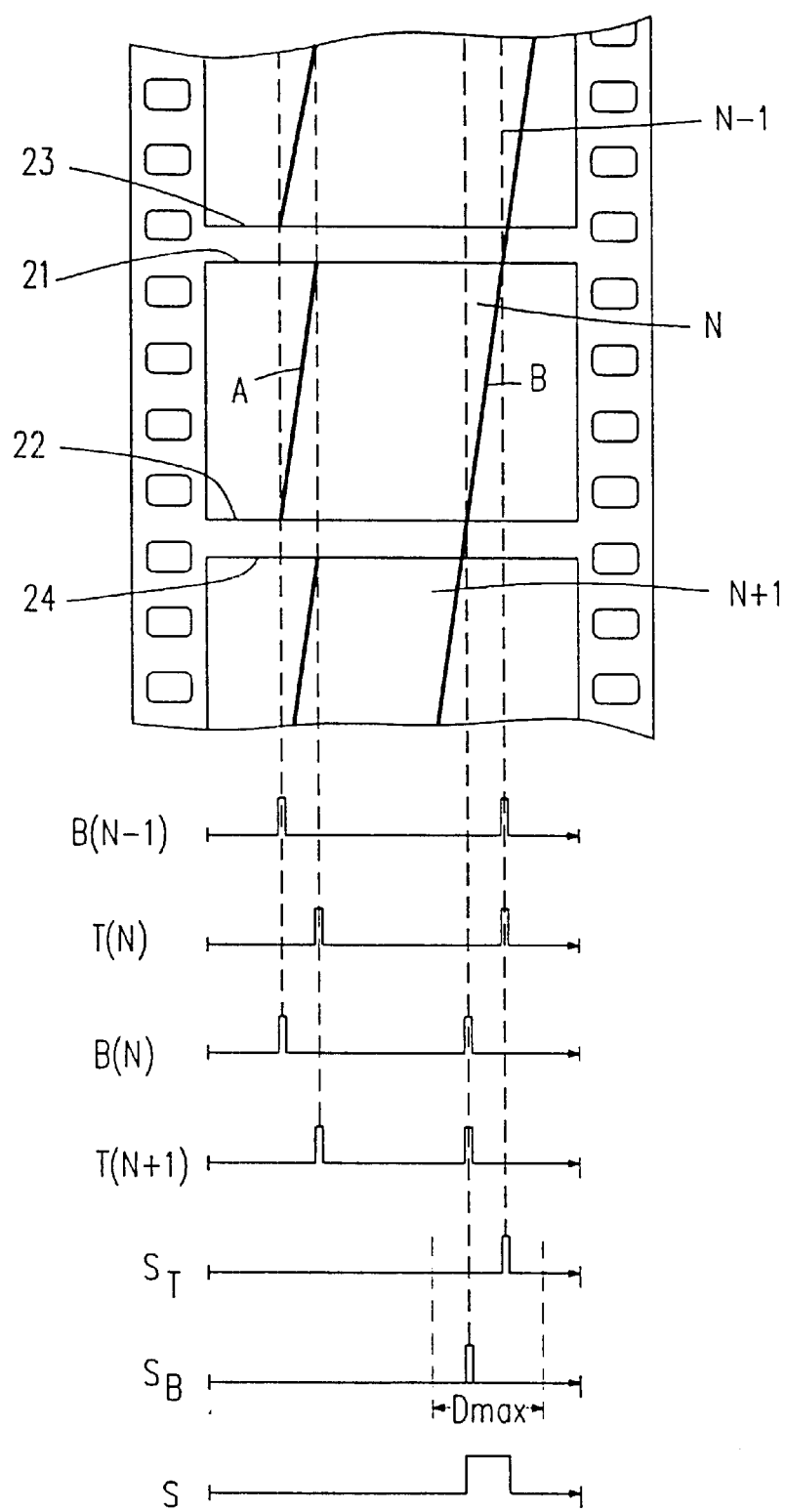
FIG. 2 shows film frames with a slanted object and slant scratches.

FIG. 2 shows three consecutive images N−1, N, N+1, in which the single images are separated from each other by the so-called film frame 20. The images comprise both a slant object A and a scratch B extending obliquely through all images. For the sake of clarity, FIG. 2 only shows a slant object A and a slant scratch B, although a plurality of scratches in an image with a plurality of slant objects can also be distinguished by means of the method and circuit arrangements described. In contrast to singular image disturbances, all scratches extending through more than one image will hereinafter be denoted as such, irrespective of the way in which they have been produced.

Figure 3:
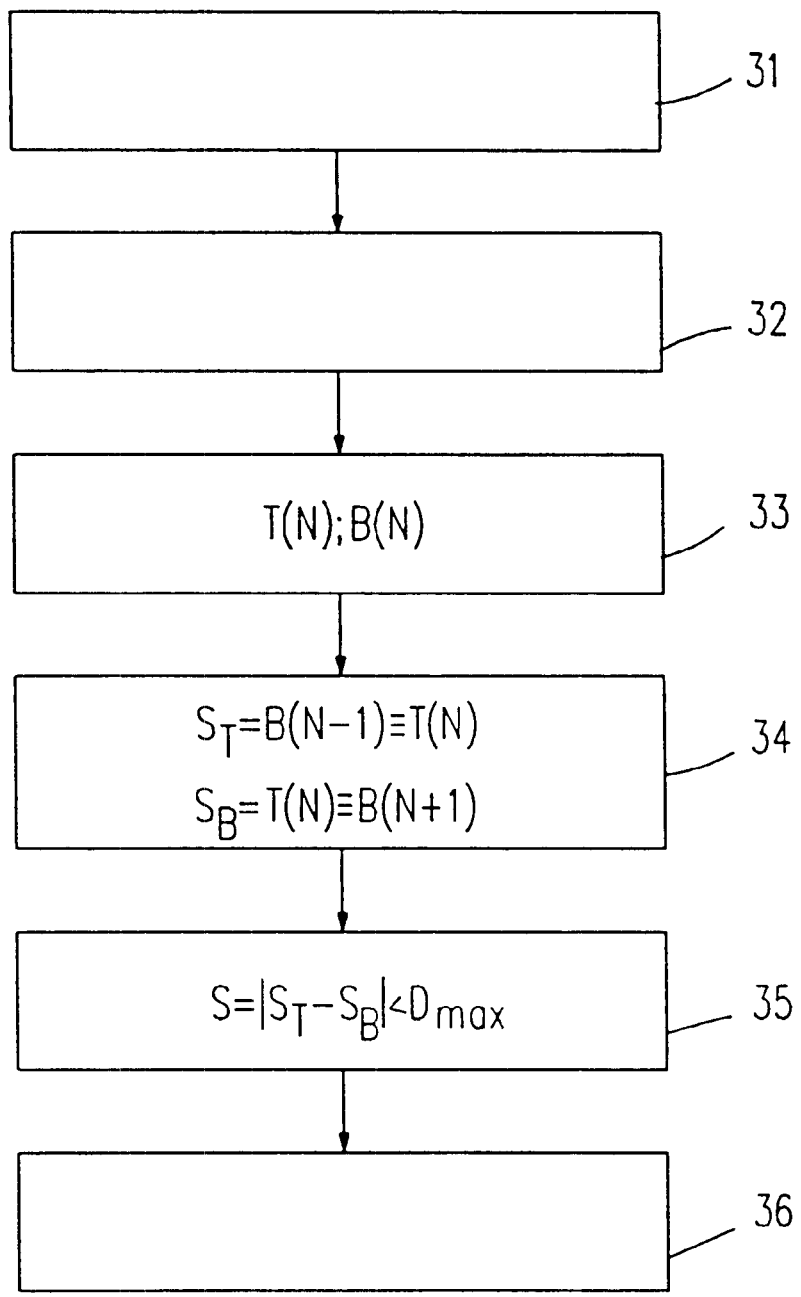
FIG. 3 shows in a flowchart steps performed on the film frames for detecting and masking particularly slant scratches.

To determine the scratch expansion, the following steps, shown in a flow-chart in FIG. 3, can be performed, for example, by a programmable signal processor.

First, all signals of vertical structures are filtered out of a video signal (block 31). Since also slant scratches B essentially extend perpendicularly to the direction of travel of the film, slant scratches are also detected in this way. When filtering out vertical structures, only those structures are preferably detected which do not exceed a predeterminable maximal width, because the width of a scratch is generally limited to a few pixels.

In a subsequent step (block 32), those structures having a given minimum contrast to their surrounding image contents are sorted out of the filtered vertical structures. The pixels of the signal sorted out in this way thus comprise only pixels which originate from very fine structures with a corresponding contrast distinction.

Subsequently (block 33), a given number of neighboring pixels aligned in the direction in which suspected scratches extend are assembled to form groups of pixels. For film scratches, which essentially extend in the film travel direction, it has proved to be adequate to examine only those neighboring pixels which are superjacent in the film travel direction. Since at least sections of slant scratches, if not inclined too much, have vertical structures, slant scratches can also be detected in this way.

Subsequently (block 34), the pixel groups are examined on whether a predominant majority of pixels with the same contrast distinction can be found. If this should be the case, these pixel groups are classified as scratch sections.

In the next step (block 35), an accumulation of scratch sections is searched which are aligned in the direction in which a suspected scratch extends. For film scratches, this search may be limited to a search for scratch sections having the same horizontal position.

Now, a scratch mask can be composed (block 36) from the scratch sections found, while additional criteria such as, for example, a test on whether a scratch extends in the previous and the subsequent image can be used to increase the reliability of detecting a scratch.

Figure 6:
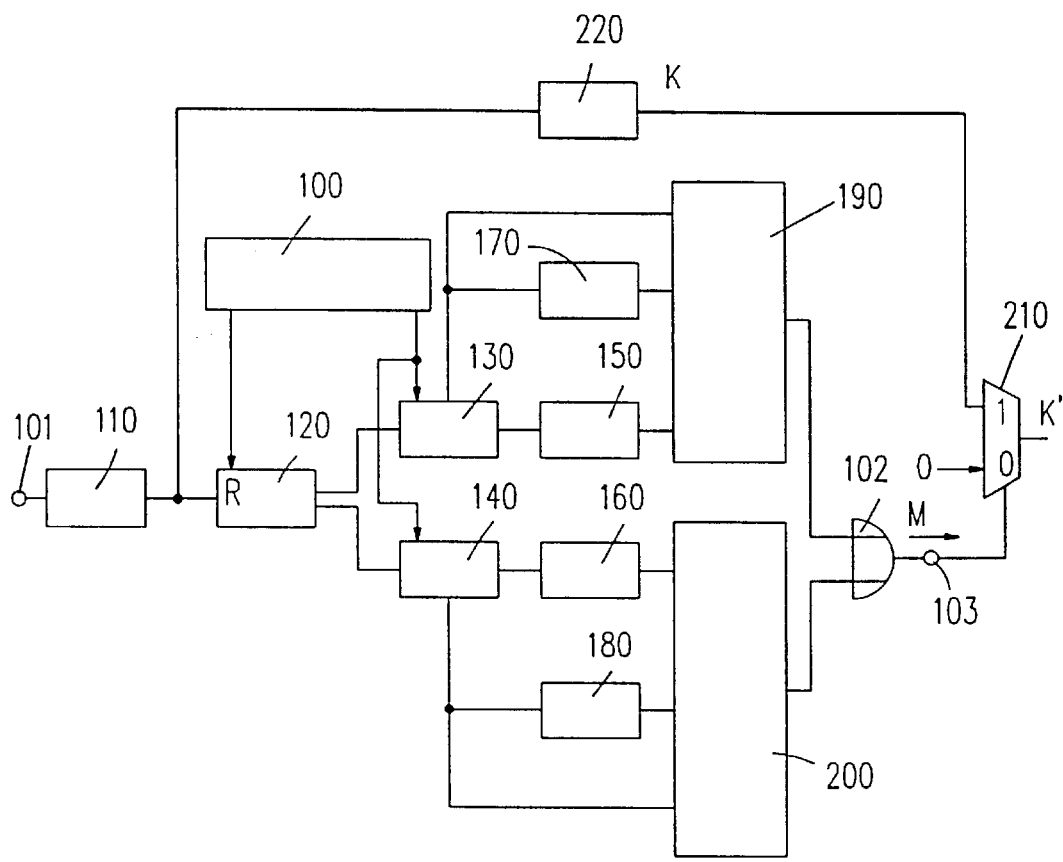
FIG. 6 shows a circuit arrangement for detecting scratches, particularly slant scratches.

FIG. 6 shows a block diagram of a scratch detector according to the invention for detecting both exactly vertical scratches and slant scratches. The scratch detector can essentially be divided into the following functional blocks:

- a filter for filtering pulse-like image variations, hereinafter referred to as pulse bandpass filter 110,
- a scratch section detector 120 which marks vertically superimposed pulse-like image variations as possible sections of a scratch,
- means for determining whether a scratch section of a current image detected at the upper margin extends from the lower margin of a preceding image into the current image, and for determining whether a scratch section of a current image detected at the lower margin extends into the upper margin of a subsequent image, hereinafter also denoted as scratch continuation detectors 130, 140,
- means for determining whether the scratch sections extending at the upper and lower margins of the preceding and subsequent images belong to the same scratch, hereinafter referred to as scratch stroke detectors 150, 160,
- two mask generators 190, 200 supplying a mask signal for concealing a detected scratch, and
- two scratch length detectors 170, 180 intended for taking the overall length of a scratch in a current image into account as an additional criterion for distinction.

Furthermore, a control circuit 100 is provided which generates several control signals, which will be explained individually, and a scratch contour amplifier 220 whose output signal is combined with the output signal of the mask generators 190, 200 in a multiplexer 210 to form an impurity concealment signal K.

Figure 7:
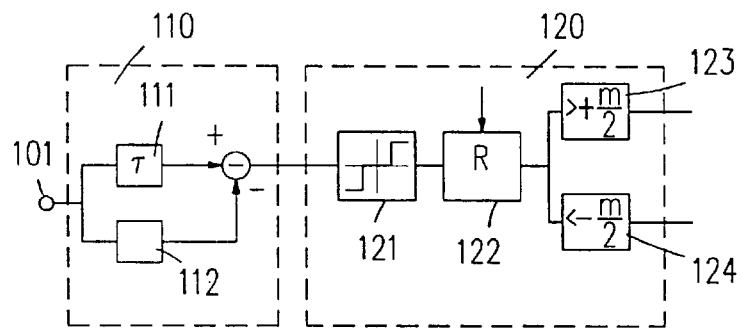
FIG. 7 shows a circuit arrangement of a pulse bandpass filter and a scratch section detector.

FIG. 7 shows a circuit detail of a pulse bandpass filter 110 and the scratch section detector 120. At an input terminal 101 of the scratch detector, the luminance component of a digital video signal is applied to the control circuit 100 and the pulse bandpass filter 110. The pulse bandpass filter 110 extracts all pulse-like variations of a given, adjustable maximum width from the luminance signal. To this end, the pulse bandpass filter 110 is preferably realized as a complementary median low-pass filter. A subtracter 113 forms the signal difference between the input signal delayed in a first delay member 111 and the input signal median-filtered in a median filter 112. The signal delay time of the first delay member 111 is dimensioned in such a way that it corresponds to the signal delay time of the median filter 112. By adjusting the number of successive pixels, whose median value is to be determined in the median filter 112, the bandwidth of the pulse bandpass filter 110 can be adjusted. If the median filter window is adjusted at, for example, five pixels, a maximum number of two pixel-wide pulses are passed in an unchanged form. The complementary median low-pass filter has the advantage that the curve shape of the scratch is maintained and that the signal edges are not widened, as is the case in, for example a high-pass filter. Further details on the structure and function of the complementary median low-pass filter are described in the aforementioned German Offenlegungsschrift DE 44 32 787.0 A1.

The output signal of the pulse bandpass filter 110 is applied to the scratch section detector 120, which consists in this embodiment of a quantizer 121, an accumulator 122 and two discriminators 123, 124. The quantizer 121 has two switching thresholds, i.e., a lower switching threshold −C and an upper switching threshold +C. The quantizer supplies the value −1 when the input signals fall below the lower switching threshold −C and +1 when the upper switching threshold +C is exceeded, and the value 0 when the input signals are between the two switching thresholds. The two switching thresholds −C and +C are preferably adjusted at 2% of a luminance signal at the end of its control range, so that already relatively small contrast variations lead to values falling below or exceeding the switching threshold. It is thereby ensured that also weakly distinct scratches or scratches in very bright or very dark image surroundings can be detected. Falling below the negative threshold value −C indicates a black scratch, exceeding the threshold value +C indicates a white scratch. Thus, only pulse-like variations with a corresponding contrast distinction are imaged at the values +1 and −1. However, video signals which do not have any pulse-like variations of the luminance, are imaged at the value 0, independent of their luminance, as well as video signals with pulse-like variations whose pulse width is larger than the adjusted pulse width of the median filter 112.

Due to the line-sequential processing of the video signal, only the vertical expansion of a scratch, i.e., the limitation of a scratch to a few horizontally juxtaposed pixels has hitherto been checked. The essence of a scratch is, however, also that it generates disturbances at approximately the same vertical position in subjacent lines of a video signal. For detecting whether the detected pulse-like variations are part of a scratch, i.e., are vertically subjacent, the sum of the output values of the quantizer 121, separated in accordance with horizontal positions, are formed in the line accumulator 122 for a predeterminable number of lines. When a video image of the PAL standard is scanned, in which the visible part of a video image effectively has 575 lines and 720 pixels per line, an accumulation through 16 lines has been found favorable in practice, if the detection is performed in fields. At the beginning of each visible video field and after the preadjusted lines, the control circuit 100 generates a reset pulse which resets the contents of the line accumulator 115 to the value 0. Thus, the scratches are detected in vertically superjacent strips.

Figure 4:
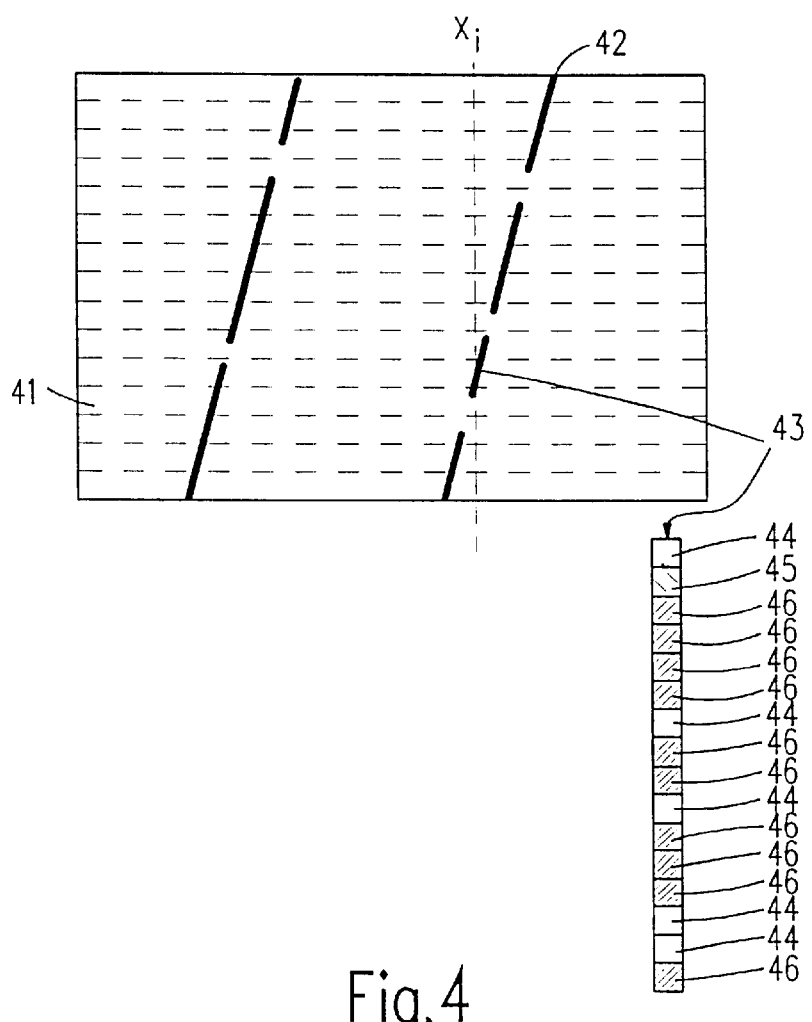
FIG. 4 shows a video image split up into strips with a column block.

FIG. 4 shows such a video image divided into strips 41 and a scratch 42 with interruptions. The pixels, subjacent at a horizontal position $x_i$, of each strip 41 constitute a column block 43; the number of pixels of a column block 43 corresponds to the number of lines used for forming the strip. At 237.5 lines of a field, each field is thus divided into fifteen strips, the lower strip being constituted only by approximately fourteen lines. This small deviation is, however, negligible for the chosen mode of processing the measured values.

The sixteen pixels of the column block 43 in FIG. 4 comprise five pixels 44 having a small contrast variation, one pixel 45 having a contrast variation in the white range and ten pixels 46 having a contrast variation in the black range. The advantage of accumulation of scratch sections separated into strips is that image details without pulse-like variations (output value of the quantizer 121 is 0) do not change the accumulation value, and image details having pulse-like variations in the white range (output value of the quantizer 121 is +1) and a pulse-like variation in the black range (output value of the first discriminator 121 is −1) at another position of the column will cancel each other (sum of −1 and +1=0). The result of the accumulation clearly differs from zero only when, within a column block 43 of the strip 41 under consideration, the sum of the contrast distinctions in one range (bright or dark) and the sum of the contrast distinctions in the other range (dark or bright) predominate. As a result, accidentally distributed pulse-like image details having opposed contrast distinctions are averaged out, whereas longer vertically extending image details complying with the conditions imposed on pulse shape and contrast distinction are amplified.

To this end, the output values of the line accumulator 122 are applied to the discriminators 123, 124, the first discriminator 123 supplying an output signal when the accumulation result is larger than half the number of lines n used for forming a strip, in this example larger than the value +8, and the second discriminator 124 supplying an output signal when the accumulation value is smaller than the negative value of half the number of lines used for forming a strip, in this example smaller than the value −8. It is thereby achieved that for image details having unambiguous contents, in which the column blocks with pulse-like image details have a contrast distinction in only one direction (black or white), the threshold value can be more easily exceeded than for image details having opposed contrast distinctions. In the column block 43 shown in FIG. 4, an accumulation value of −9 results from five pixels 44 with the value 0, one pixel with the value +1 and ten pixels with the value −1, so that the second discriminator 124 supplies an output pulse for characterizing a black scratch section.

The selected threshold values ensure that at least two-by-two pixels of a scratch or at least one-by-three pixels of a scratch must be directly subjacent so as to be classified as pixels of a scratch section. The great reliability with which scratch sections can be detected in this way also provides the possibility, as already described, to set the threshold value of the contrast distinction at a correspondingly low level so that erroneous decisions based on a low contrast value, which are taken into the bargain so as to be able to detect also faint scratches, are compensated by the decision about accumulated values of a column block.

With this detection mode, approximately those pixels of scratches can be considered which change their vertical position on the selected lines maximally by the pulse bandwidth of the pulse bandpass filter 110. Thus, the number of lines of a strip at a predetermined maximum width of a scratch (=bandwidth of the pulse bandpass filter 110) determines the maximum angle of inclination which a slant scratch may occupy with respect to the high axis of a video image if, in the most favorable case, it is still to be detected as a section of a scratch.

Figure 8:
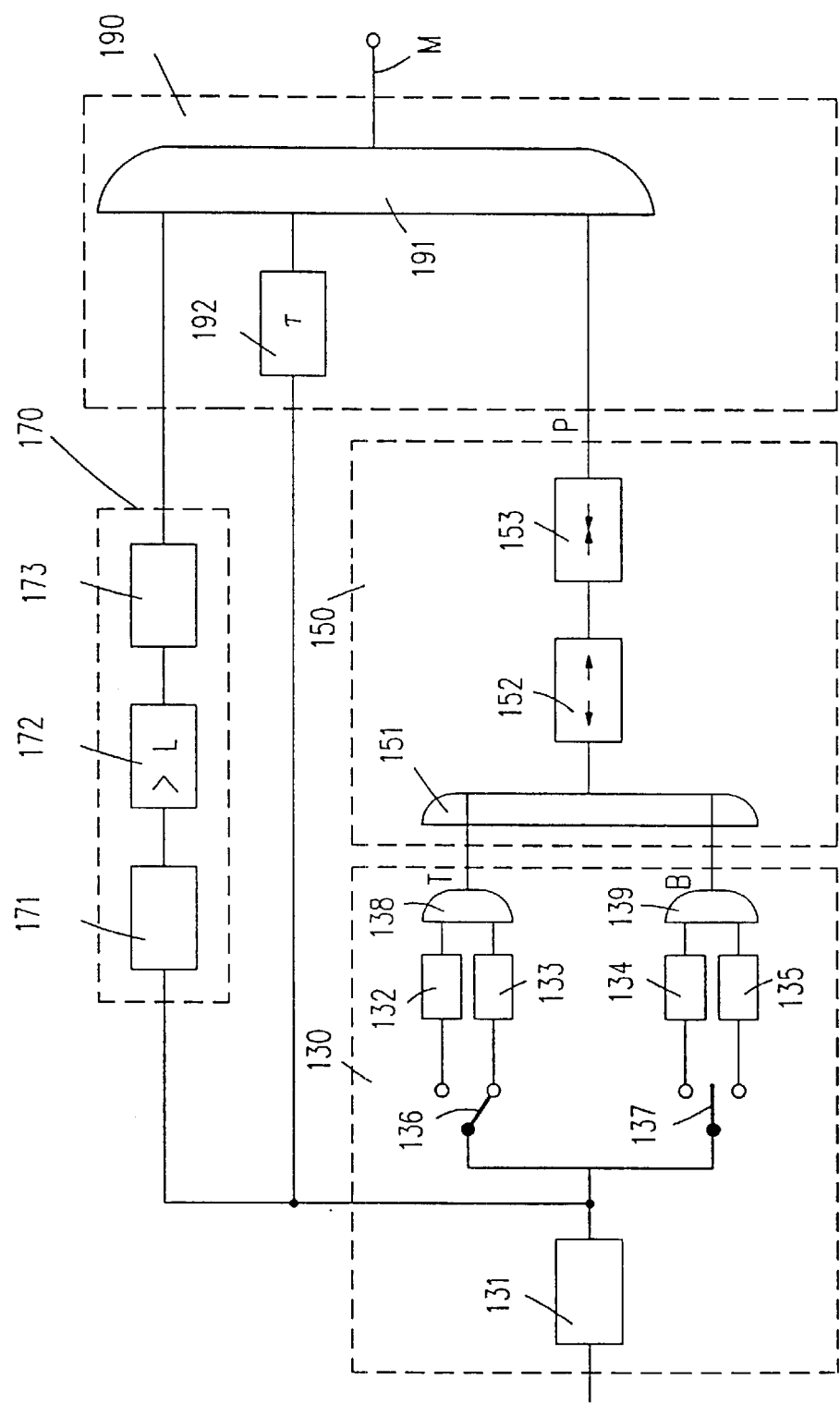
FIG. 8 shows a circuit arrangement of a scratch continuation detector, a scratch stroke detector, a mask generator and a scratch length detector.

The output signals of the discriminators 123, 124 set marks for detected scratch sections at the horizontal positions of each strip, which marks will hereinafter be referred to as scratch marks. The further evaluation of the scratch marks will now be given for black and white scratches in separate function blocks, with the output signal of the first discriminator 123 constituting the input signal of the function blocks 130, 150, 170, 190 for evaluating white scratches, and the output signal of the second discriminator 124 constituting the input signal of the function blocks 140, 160, 180, 200 for evaluating black scratches. However, since each function block has an identical structure, only the way in which the white scratches are dealt with will hereinafter be described with reference to FIG. 8.

The logic output values of the first discriminator 123 are temporarily stored in a first line memory 131 of the scratch continuation detector 130. At the end of a strip, the first line memory 131 each time takes over the result before the accumulator 122 is reset. The scratch continuation detector 130 comprises four further line memories 132, 133, 134, 135 which are controlled by the control circuit 100 in such a way that they take over the contents of the first line memory 131 at different instants. The temporally different take-over is symbolized in FIG. 5 by means of switches 136, 137.

In the following description, it will be assumed for a scratch to be detected in a current image N that, in an image N−1 preceding the current image N, the contents of the first line memory 131 are stored in the second line memory 132 after the last line of the image N−1 has been analyzed, and this before the first line memory 131 is reset. The second line memory 132 then holds the scratch marks of the lower strip (lines 273–287 of a field) of the image N−1 preceding the current image N. When the current image N is analyzed, the control circuit 100 controls the third line memory 133 in such a way that the scratch marks of the first sixteen lines, i.e., the lines of the upper strip of the current image N are stored in the third line memory 133 (the switch position of the first switch 136 symbolizes this instant). After the scratch marks of the last lines, i.e., the lines 273 to 287, have been formed in the current image N, the result of the first line memory 131 is stored in the fourth line memory 134 by means of the control circuit 100. After the scratch marks of the first 16 lines of the new, subsequent image N+1 have been completely stored in the first line memory 131, the control circuit 100 transfers the contents of the first line memory 131 by means of corresponding control signals to the fifth line memory 135. By way of position-comparison of the memory contents of the second line memory 132 and the third line memory 133 in a first AND gate 138, it is now possible to determine corresponding positions $S_T$ of scratch marks between the lower margin of a preceding image N−1 and the upper margin of a current image N, and by way of simultaneous position-comparison of the contents of the fourth line memory 135 and the fifth line memory 135 in a second AND gate 139, it is now possible to determine corresponding positions $S_B$ of scratch marks between the lower margin of a current image N and the lower margin of an image N−1 succeeding the current image. By means of the comparison, employing the two AND gates 138, 139, the scratch sections S are sorted out which continue at the same position at which they have left the lower margin of a preceding image as at the position at the upper margin in the subsequent image, or the scratch sections which have left the lower margin of an image and appear at the same horizontal position at the upper margin of the subsequent image. Due to the relatively small height of the film frame with respect to the height of a film image, this condition applies to scratches which either extend exactly perpendicularly through the image or extend slightly aslant through the image. However, image details A, fulfilling two fundamental conditions of a scratch, namely a narrow contour with a corresponding contrast difference and which are slightly inclined in the image but, in contrast to a film scratch, do not change their positions from image to image, can be certainly distinguished from slant scratches in this way because their horizontal position between the lower margin of the preceding image N−1 and the upper margin of the current image N, as well as the horizontal position between the lower margin of the current image N and the upper margin of the image N+1 succeeding the current image clearly differ from each other.

The horizontal position of slightly inclined scratches changes only to a small extent during the film frame travel so that a check for identical scratch marks $S_T$, $S_B$ is fully adequate. To detect scratches with a larger inclination, scratch marks occurring within a predetermined tolerance range rather than identical scratch marks should be searched.

Storing the memory contents of the first line memory 131 by means of the control circuit 101 is permanently continued, as described above, so that the scratch marks T of an upper strip are alternately stored in the third and the fifth line memory 133, 135, respectively, and the scratch marks B of the lower strip of each image are alternately stored in the second and the fourth line memory 132, 134, respectively. In this way, the pairwise required marks are available for each image to be evaluated . . . , N–1, N, N+1, . . . , each time one image later, and for the image for which the evaluation is to be performed. Since in the subsequent combination the output signals T, B of the first and second AND gates 138, 139 are arbitrarily exchangeable in an OR gate 151 as input signals of an OR gate without varying the output signal, it is not important that the significance of the output signals T and B of the two AND gates 138, 139 is exchanged at every second evaluation of an image. However, due to the alternate way of storing as described above, the storage capacity of line memories may remain very small.

In the scratch stroke detector 150, it is subsequently checked whether a scratch detected at the upper margin and extending beyond the frame at a position $S_T$ corresponds to a scratch detected at the lower margin and extending beyond the frame at a position $S_B$, i.e., the scratch positions $S_T$, $S_B$ are located so close together that they probably originate from a slant scratch. To this end, the upper scratch marks $S_T$ and lower scratch marks $S_B$ combined in an OR gate 151 are widened by a given number of m pixels in an expansion filter 152. The number of pixels by which the scratch marks are widened also determines the range within which the slant scratch is still detected as such. In practice, widening by 1% of the pixels of a line to the left and right has been found to be a favorable value.

To widen the scratch marks, sixteen juxtaposed scratch marks will be considered in this embodiment. As soon as one of these scratch marks has the logic value one, all other scratch marks are also set to this value. By way of subsequent signal narrowing in a compression filter 153 by the same number m of pixels by which the signal was originally widened, a signal will only be left when the widened areas of an upper and a lower scratch mark have merged with each other, i.e., have overlapped each other completely or partly. In this way, it is ensured that a signal, hereinafter referred to as scratch conformity signal P, is generated only when the position of the scratch at the upper margin is not too far remote from the position at which a scratch leaves the lower margin, thus when the angle of inclination of the scratch is not too large. Scratch continuation detector 130 and scratch stroke detector 150 are controlled by the control circuit 100 in such a way that the scratch conformity signal P is generated in each line of a current image N.

Since the scratch conformity signal P extends throughout the scratch stroke of a current image, it also covers, in the case of slant scratches, many pixels which are not disturbed by scratches. In a masking gate 191 of the mask former 190, the scratch conformity signal P is therefore combined with the scratch marks of the current image in such a way that only the column block of each strip classified as a scratch section is masked. To this end, the scratch marks stored per strip in a first line memory 131 are line-sequentially supplied and delayed in second delay member 192 in conformity with the cycle of operation and computation of the scratch section detector 130 and the scratch stroke detector 150. Due to the AND operation, the masking signal M supplied by the masking gate 191 is reduced to the column blocks detected as scratch sections so that the concealment only covers narrow areas of the image, also when there are slant scratches. In this way, a concealment of pixels which do not form part of the scratch but are located in the vicinity of a scratch is avoided.

Figure 5:
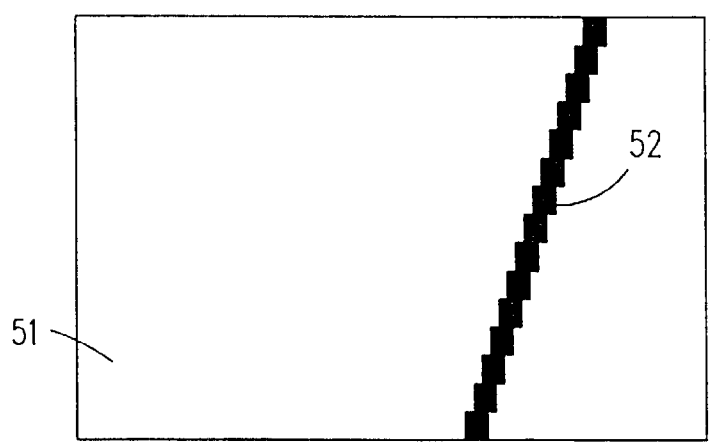
FIG. 5 shows scratch masks composed of masking blocks of a video image.

FIG. 5 shows a scratch mask of a video image 51 composed of masking blocks 52. Because of the large number of small masking blocks, the scratch mask can be very well adapted to the shape of the scratch.

With the arrangement described so far, a concealment of scratches extending vertically through the image as well as scratches extending aslant through the image would be adequate because the continuation of a scratch from the lower margin of a preceding image into the upper margin of a current image and a scratch leaving the lower margin of a current image and appearing at the upper margin of the subsequent image will yield a reliable detection of a scratch in most cases. Only a very small number of image details, which are not scratches, would comply with all these conditions and would be erroneously concealed. However, a perfect scratch detection also includes the consideration whether the scratch extends through the image in a substantially coherent way. To this end, the length detector 170 comprises a second line accumulator 171 by means of which all scratch marks are summed column by column, i.e., separated in conformity with the horizontal position, each time through a complete image. At the end of an image, the accumulation value of each image column is compared with a predeterminable threshold value L in a length discriminator 172, and in so far as the threshold value has been exceeded, a mark for the relevant horizontal position is set in a sixth line memory 173, which mark is taken over each time at the end of an image. The marked horizontal positions are thus maintained each time for an examined frame (field) and are line-sequentially read synchronously with the scratch conformity signal P. Since the time of operation of scratch section detector 130 and scratch stroke detector 150 also corresponds to a frame (field), the images for which the scratch length signal L and the scratch conformity signal P are generated also correspond to each other.

By means of the scratch length detector 170, it is checked in the manner described whether a given number of scratch marks occurs at the same horizontal position and the scratch thus has a given minimum expansion. Since the most favorable value for the threshold value L is dependent on the film material used (the range of a black scratch extending through a dark image detail would not be recognized as a scratch and thus reduces the length of a scratch determined in such an image) as well as on the angle of inclination of the scratch itself, this threshold value can be arbitrarily adjusted by a user of the device. In the embodiment, in which a field is divided into fifteen strips, for example, a threshold value L of eight indicates that the total length of a scratch consisting of scratch sections should occupy at least half the image height in order that the scratch marks of the upper and lower margins are actually also accepted as parts of a scratch. If scratches having a stronger inclination are still to be recognized as such, the value of L may be reduced to, for example, 20%. Even though this value seems to be relatively low, practice has proved that the rate of erroneous detections can be still further reduced by this additional detection criterion.

Figure 9:
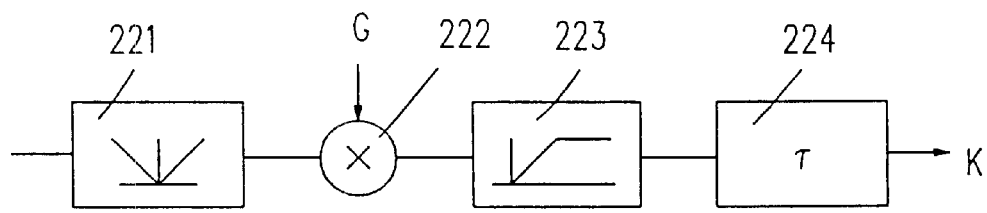
FIG. 9 shows a circuit arrangement of a scratch contour amplifier.

To form a correction signal, which is even better adapted to the scratch shape, particularly to the curve of slant scratches, the masking signal M is used for switching the multiplexer 210 in this embodiment, which multiplexer puts through the signal supplied by a scratch contour amplifier 220 in the case of an active masking signal M. In the embodiment, the output signal of the pulse bandpass filter 110 is applied to the input of the scratch contour amplifier 210, so that only image details having the corresponding horizontal maximum width are amplified. As shown in FIG. 9, an absolute-value former 221 ensures that the black and white scratches are equally dealt with. By multiplication of the scanning values in a multiplier 222 by an adjustable gain factor G, faint scratches can be accentuated. A limitation of the output signal of the multiplier 222 in a limiter 223 cuts off the output signal at a maximum level and prevents the effects of an internal overflow during multiplication. A subsequent further delay memory 224 compensates delay differences when the masking signal M is being formed. The scratch mask can be much better adapted to the shape of the scratch by means of the scratch contour signal K. The masking signal M switches over to the scratch contour signal K only when a scratch is detected, so that the scratch contour signal itself is used as an impurity concealment signal K'.

Moreover, scanning values having an eight-bit data word length are used in the embodiment as input signals of the complementary median low-pass filter, and also the complementary median low-pass filter supplies data words having an eight-bit data word length as output signals. While only two-bit data words or one-bit signals are used by the quantization in the scratch detector, which considerably simplifies the processing of these signals, the contour amplification is performed at the full data word length. The impurity concealment signal K' is thus also multivalent, while the valency of the impurity signal is a measure of the scratch intensity. By means of the multivalent impurity signal K', the extent of concealment can be controlled in dependence upon the intensity of a scratch. The concealment will then be even much less visible.

What is claimed is:

1. A video signal-processing device comprising an arrangement for detecting scratches in images of a video signal, characterized in that the arrangement for detecting scratches comprises:
    means for combining a given number (m) of series-arranged pixels of a video image to form a group;
    means for determining a division of the pixels in accordance with given criteria for each group of pixels; and
    means for classifying, based on this division, the pixel groups in scratch sections and non-scratch sections,
    further characterized in that, for the purpose of classification of scratch sections, the arrangement comprises:
    means for comparing high-pass-filtered pixels with at least a contrast threshold value (+C);
    means for determining a sum of the pixels of a pixel group exceeding a given contrast threshold value (+C); and
    means for classifying, in so far as this sum exceeds a further threshold value (m/2), this pixel group as a scratch section.

2. A video signal-processing device comprising an arrangement for detecting scratches as claimed in claim 1, characterized in that the arrangement for detecting scratches comprises:
    means for determining the number of pixel groups classified as scratch sections of an image area (xi) of the video image in which a scratch is suspected;
    means for comparing this number with a first threshold value (L); and
    means for signaling, the suspected scratch as a recognized scratch only when the first threshold value (L) is exceeded.

3. A video signal-processing device comprising an arrangement for detecting scratches in images of a video signal as claimed in claim 1, characterized in that the arrangement for detecting scratches uses the pixel groups classified as scratch sections for forming a scratch mask.

4. A video signal-processing device comprising an arrangement for detecting scratches as claimed in claim 1, characterized in that the pixels occurring in a given number n of vertically subjacent lines at the same horizontal position (xi) are combined to form the pixel groups.

5. An arrangement for detecting scratches in images of a video signal, characterized in that the arrangement for detecting scratches comprises:
    means for combining a given number (m) of series-arranged pixels of a video image to form a group;
    means for determining a division of the pixels in accordance with given criteria for each group of pixels; and
    means for classifying, based on this division, the pixel groups in scratch sections and non-scratch sections,
    further characterized in that, for the purpose of classification of scratch sections, said arrangement for detecting scratches comprises:
    means for comparing high-pass-filtered pixels with at least a contrast threshold value (+C);
    means for determining a sum of the pixels of a pixel group exceeding a given contrast threshold value (+C); and
    means for classifying, in so far as this sum exceeds a further threshold value (m/2), this pixel group as a scratch section.

6. An arrangement for detecting scratches as claimed in claim 5, characterized in that the arrangement for detecting scratches comprises:
    means for determining the number of pixel groups classified as scratch sections of an image area (xi) of the video image in which a scratch is suspected;
    means for comparing this number with a first threshold value (L); and
    means for signaling the suspected scratch as a recognized scratch only when the first threshold value (L) is exceeded.

7. An arrangement for detecting scratches in images of a video signal as claimed in claim 5, characterized in that the arrangement for detecting scratches uses the pixel groups classified as scratch sections for forming a scratch mask.

8. An arrangement for detecting scratches as claimed in claim 5, characterized in that the pixels occurring in a given number n of vertically subjacent lines at the same horizontal position (xi) are combined to form the pixel groups.

9. A video signal-processing device comprising an arrangement for detecting scratches in images of a video signal, characterized in that the arrangement for detecting scratches comprises:
    means for combining a given number (m) of series-arranged pixels from contiguous scan lines of a single uncombined video image to form a group;
    means for determining a division of the pixels in accordance with given criteria for each group of pixels; and
    means for classifying, based on this division, the pixel groups in scratch sections and non-scratch sections
    further characterized in that, for the purpose of classification of scratch sections, the arrangement comprises:
    means for comparing high-pass-filtered pixels with at least a contrast threshold value (+C);
    means for determining a sum of the pixels of a pixel group exceeding a given contrast threshold value (+C); and
    means for classifying, in so far as this sum exceeds a further threshold value (m/2), this pixel group as a scratch section.

10. A video signal-processing device comprising an arrangement for detecting scratches as claimed in claim 9, characterized in that the arrangement for detecting scratches comprises:

means for determining the number of pixel groups classified as scratch sections of an image area of the video image in which a scratch is suspected;

means for comparing this number with a first threshold value; and means for signaling, the suspected scratch as a recognized scratch only when the first threshold value (L) is exceeded.

11. A video signal-processing device comprising an arrangement for detecting scratches in images of a video signal as claimed in claim 9, characterized in that the arrangement for detecting scratches uses the pixel groups classified as scratch sections for forming a scratch mask.

12. A video signal-processing device comprising an arrangement for detecting scratches as claimed in claim 9, characterized in that the pixels occurring in a given number n of vertically subjacent lines at the same horizontal position are combined to form the pixel groups.

13. A film scanner for scanning a film image and detecting scratches in the film image, the film scanner comprising:

a scanning device for producing a single uncombined video image from the film image;

a combining device for combining a given number (m) of series-arranged pixels from contiguous scan lines of the single uncombined video image to form a group;

a scratch detector for determining a division of the pixels in accordance with given criteria for each group of pixels wherein the pixel groups are classified in scratch sections and non-scratch sections, wherein the scratch detector comprises:

means for comparing high-pass-filtered pixels with at least a contrast threshold value (+C);

means for determining asum of the pixels of a pixel group exceeding a given contrast threshold value (+C); and means for classifying, in so far as this sum exceeds a further threshold value (m/2), this pixel group as a scratch section.

14. The film scanner of claim 13, comprising:

means for determining the number of pixel groups classified as scratch sections of an image area of the video image in which a scratch is suspected;

means for comparing this number with a first threshold value (L); and means for signaling the suspected scratch as a recognized scratch only when the first threshold value (L) is exceeded.

15. The film scanner of claim 13, wherein the pixel groups classified as scratch sections are utilized for forming a scratch mask.

16. The film scanner of claim 13, wherein the pixels occurring in a given number n of vertically subjacent lines at the same horizontal position are combined to form the pixel groups.

* * * * *